US010324862B2

(12) United States Patent
Leslie-Hurd et al.

(10) Patent No.: US 10,324,862 B2
(45) Date of Patent: Jun. 18, 2019

(54) SUPPORTING OVERSUBSCRIPTION OF GUEST ENCLAVE MEMORY PAGES

(71) Applicant: Intel Corporation, Santa Clara, CA (US)

(72) Inventors: Rebekah M. Leslie-Hurd, Portland, OR (US); Francis X. McKeen, Portland, OR (US); Carlos V. Rozas, Portland, OR (US); Gilbert Neiger, Hillsboro, OR (US); Asit K. Mallick, Saratoga, CA (US); Ittai Anati, Haifa (IL); Ilya Alexandrovich, Haifa (IL); Vedvyas Shanbhogue, Austin, TX (US); Somnath Chakrabarti, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 15/282,300

(22) Filed: Sep. 30, 2016

(65) Prior Publication Data
US 2018/0095894 A1 Apr. 5, 2018

(51) Int. Cl.
G06F 3/06 (2006.01)
G06F 12/12 (2016.01)
(Continued)

(52) U.S. Cl.
CPC ............ *G06F 12/12* (2013.01); *G06F 3/0604* (2013.01); *G06F 3/064* (2013.01); *G06F 3/0631* (2013.01);
(Continued)

(58) Field of Classification Search
CPC ........ G06F 12/12; G06F 3/0631; G06F 3/064; G06F 3/0664; G06F 3/0665;
(Continued)

(56) References Cited

U.S. PATENT DOCUMENTS

2006/0080372 A1 4/2006 Barua et al.
2012/0159184 A1* 6/2012 Johnson .............. G06F 21/6218
713/189
(Continued)

FOREIGN PATENT DOCUMENTS

WO WO2015163898 10/2015

OTHER PUBLICATIONS

International Search Report for PCT Patent Application No. PCT/US2017/049431 dated Dec. 8, 2017, 12 pages.

*Primary Examiner* — Pierre Miche Bataille
(74) *Attorney, Agent, or Firm* — Lowenstein Sandler LLP

(57) ABSTRACT

Implementations of the disclosure provide for supporting oversubscription of guest enclave memory pages. In one implementation, a processing device comprising a memory controller unit to access a secure enclave and a processor core, operatively coupled to the memory controller unit. The processing device is to identify a target memory page in memory. The target memory page is associated with a secure enclave of a virtual machine (VM). A data structure comprising context information corresponding to the target memory page is received. A state of the target memory page is determined based on the received data structure. The state indicating whether the target memory page is associated with at least one of: a child memory page or a parent memory page of the VM. Thereupon, an instruction to evict the target memory page from the secure enclave is generated based on the determined state.

20 Claims, 13 Drawing Sheets

(51) Int. Cl.
  *G06F 12/0875* (2016.01)
  *G06F 9/455* (2018.01)
(52) U.S. Cl.
  CPC .......... *G06F 3/0664* (2013.01); *G06F 3/0665* (2013.01); *G06F 3/0673* (2013.01); *G06F 9/45558* (2013.01); *G06F 12/0875* (2013.01); *G06F 2009/45583* (2013.01); *G06F 2212/1016* (2013.01); *G06F 2212/151* (2013.01); *G06F 2212/152* (2013.01); *G06F 2212/402* (2013.01); *G06F 2212/604* (2013.01)
(58) Field of Classification Search
  CPC ............... G06F 3/0673; G06F 12/0875; G06F 9/45558; G06F 3/0604; G06F 3/06; G06F 9/455
  USPC ........................................................ 711/133
  See application file for complete search history.

(56) References Cited

U.S. PATENT DOCUMENTS

| | | | |
|---|---|---|---|
| 2013/0159726 A1* | 6/2013 | McKeen | G06F 21/72 713/189 |
| 2013/0198853 A1 | 8/2013 | McKeen et al. | |
| 2013/0232344 A1* | 9/2013 | Johnson | G06F 21/6218 713/193 |
| 2014/0007087 A1* | 1/2014 | Scott-Nash | G06F 21/53 718/1 |
| 2014/0258733 A1* | 9/2014 | Scott-Nash | G06F 12/1408 713/190 |
| 2015/0378766 A1 | 12/2015 | Beveridge et al. | |
| 2016/0147619 A1 | 5/2016 | Borthakur et al. | |
| 2016/0283409 A1* | 9/2016 | Pandey | G06F 21/57 |

\* cited by examiner

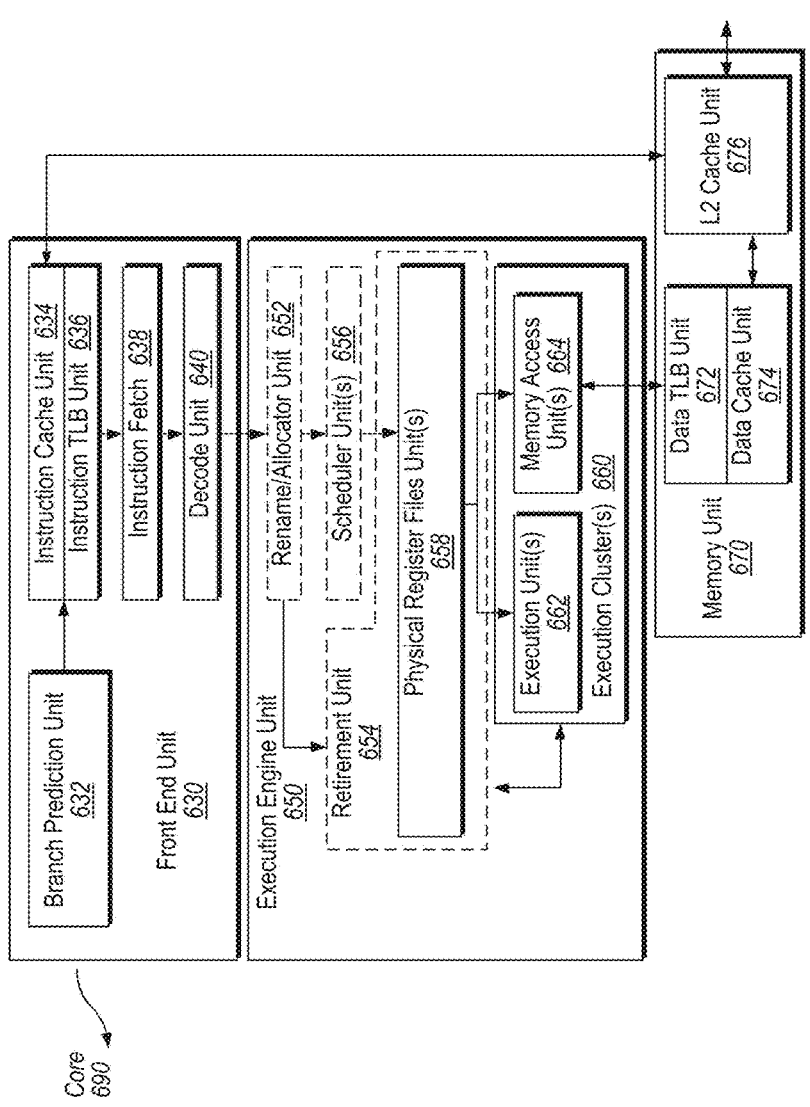

US 10,324,862 B2

SUPPORTING OVERSUBSCRIPTION OF GUEST ENCLAVE MEMORY PAGES

TECHNICAL FIELD

The implementations of the disclosure relate generally to computer systems, and more specifically, but without limitation, to supporting oversubscription of guest enclave memory pages.

BACKGROUND

Modern processors are designed to protect sensitive data in memory from both hardware and software attacks. Some processors provide strategies that can reserve a portion of memory and enforce cryptographic protections on this portion of memory. The portion of memory may include a plurality of secure memory pages that are accessible on a secure platform.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 6A is a block diagram illustrating a micro-architecture for a processor according to an implementation of the disclosure.

FIG. 6B is a block diagram illustrating an in-order pipeline and a register renaming stage, out-of-order issue/execution pipeline according to an implementation of the disclosure.

DETAILED DESCRIPTION

Figure 1:
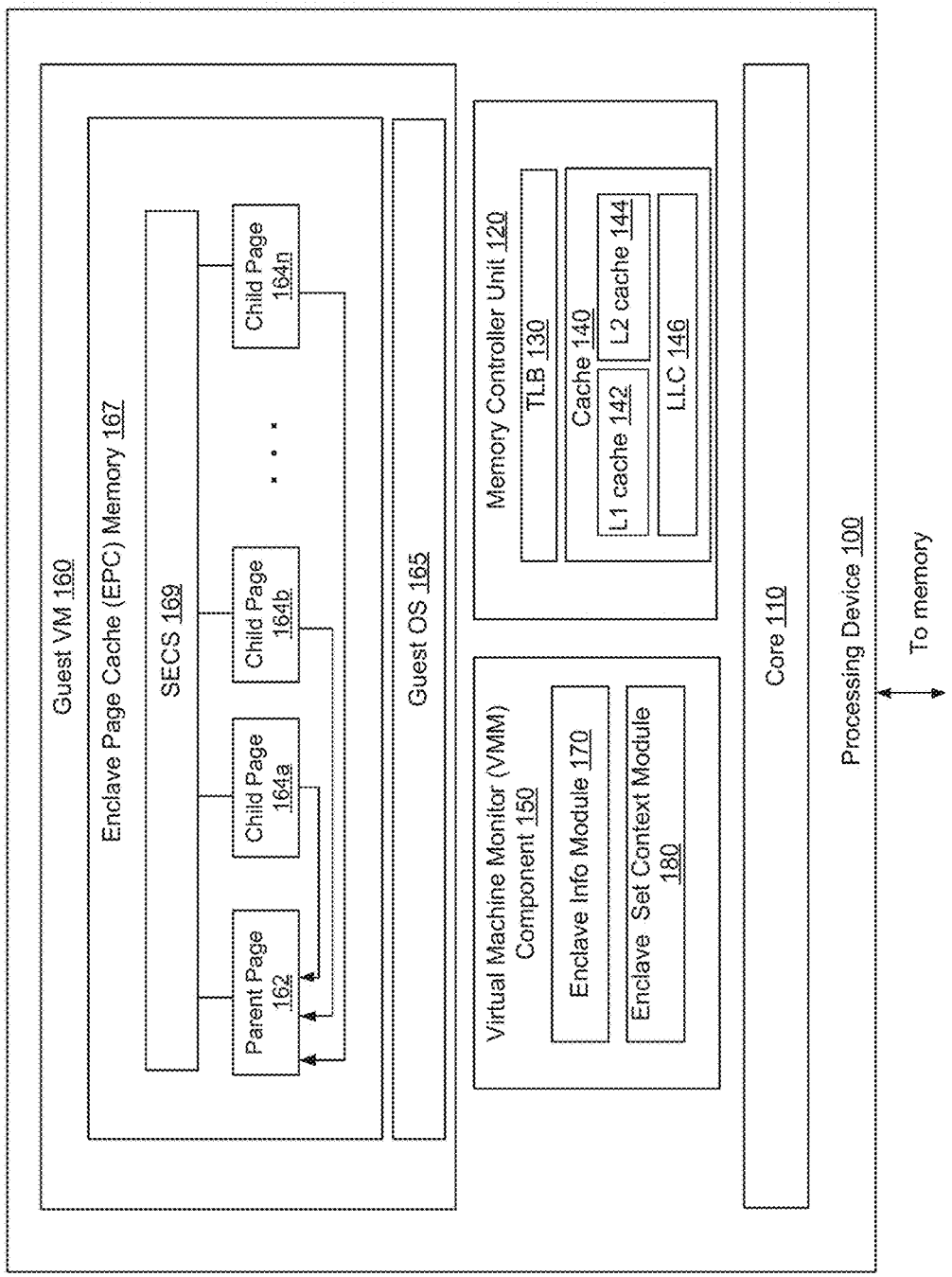
FIG. 1 illustrates a block diagram of a processing device to support oversubscription of enclave memory pages according to an implementation of the disclosure.

Implementations of the disclosure provide for supporting oversubscription of guest enclave memory pages. A processing device, such as a processor, may implement a trusted execution environment also referred to as an enclave memory (EM). A trusted execution environment is a secure area of the processing device that ensures that applications and data loaded inside are to be protected with respect to confidentiality and integrity. The processing device may execute instructions residing in EM and access data residing in this EM, while preventing unauthorized access to the EM. Access to memory pages associated with the EM from applications not resident in the EM is prevented even if such access is attempted by a privileged application, such as basic input/output system (BIOS), operating systems or virtual machine monitors.

An active EM may be divided into an encrypted portion and a decrypted portion. The encrypted portion may reside in unprotected memory (such as main memory or disk). The decrypted portion may reside in an enclave page cache (EPC) associated with the EM. The EPC is protected memory used by the processing device to temporarily store the EM pages. The EPC includes EM pages, such as a parent page, and a plurality of child pages associated with the parent page. The parent page includes metadata about the EPC. Such metadata may include, but is not limited to, a size of an EPC base address of the EPC, a total number of child pages, etc. Each of the plurality of child pages includes an address, which points to an address of the parent page. The processing device may implement several processes for managing EM pages in the EPC. Such managing may include paging instructions to securely move EM pages (parent and corresponding child pages) in and out of the EPC. The paging instructions may include, but are not limited to, loading of the EM pages into the EPC, accessing the EM pages in the EPC, and evicting the EM pages from the EPC.

In some implementations, the processing device may implement a virtual machine monitor (VMM) (also referred to as a hypervisor) that manages a plurality of virtual machines (VMs) to access resources of a hardware platform associated with the EM. The VMM that is executed by the processing device may implement oversubscription for the VMs. Oversubscription is a mechanism in which the VMM make more platform resources (e.g., memory, processor, etc.) available, for example, to the VMs than what is actually available on the hardware platform. Oversubscription may extend to sharing EM, such as sharing of the same one or more child pages of the EPC amongst a plurality of VMs.

In conventional systems, to support such oversubscription of the EPC for VMs, the VMM may attempt to remove a child page from the EPC associated with a first VM to provide that page to another VM. If, however, both the VMM and the VM are performing operations on the EM page, situations may arise where the VM may remove a parent page from the EPC even though there are still one or more child pages associated with the parent page. In such situations, when the parent page is removed from the EPC, the VMM may not able to load a child page associated with the parent page back into the EPC because the corresponding parent page is not present in the EPC. In other situations, the VM may not be able to access that portion of the EPC associated with the parent page, thereby causing a page fault.

In the conventional systems, to prevent the VM from removing a parent page from the EPC that still has child pages, the VMM may cause the VM to exit upon occurrence of paging instructions. This is because the VMM lacks knowledge about the VM's usage of EPC pages. Subsequently, the VMM may inject a failure alert in response to the VM's attempts to remove a parent page from the EPC, which may block the VM from executing any instructions. In other situations, the VMM may track the usage of EPC pages by a VM by storing such information in the VMM. This tracking by the VMM of the VM's usage of EPC pages can lead to adverse affects on system overhead and performance.

Implementations of the disclosure address the shortcomings of the conventional systems by providing a VMM with active information regarding a guest OS usage of a given EPC page without having the VMM cause VM exits associated with the EPC page. In one implementation, a processor module to execute a certain instruction is provided. In some implementations, the instruction may be used to determine certain context information regarding an EPC page without having the VMM incur the overhead of maintaining the context information. This context information may include, for example, various page attributes, parent location information, and other relevant information. In other implementations, another processor module to execute a different instruction is provided. This different instruction allows the VMM to apply certain context information regarding the EPC page inside of enclave memory. This information may include, for example, an enclave parent pointer as well as other relevant information to keep track of the parent/child relationship of the EPC pages. In this regard, the processor instructions allow the VMM to control a guest from removing or evicting enclave memory pages.

Implementations of the disclosure may be advantageous for allowing a VMM to oversubscribe EPC memory page allocated to a particular VM. By providing the VMM with access and the ability to adjust the usage of the EPC pages, the VMM may be able to allocate an EPC page from one VM to another VM without having to impact system performance, for example, by stopping all of the VMs managed by the VMM in order to make the allocation change. Moreover, the techniques provided herein allow the VMM to determine on-demand information regarding usage of EPC pages without increasing system overhead to track and maintain this usage information within the VMM.

FIG. 1 is a block diagram illustrating a processing device 100, which may support oversubscription of enclave memory pages according to one implementation. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor, which is typically capable of processing a single instruction pipeline, or a multi-core processor, which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one implementation, processing device 100 may include one or more processors cores 110 and a memory controller unit (MCU) 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another implementation, the processing device 100 may be used in a system on a chip (SoC) system. In one implementation, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

The processor core(s) 110 may execute instructions of the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one implementation, a sample computing system may execute a version of an operating system, embedded software, and/or graphical user interfaces. Thus, implementations of the disclosure are not limited to any specific combination of hardware circuitry and software.

In an illustrative example, processing core 110 may have a micro-architecture including processor logic and circuits used to implement an instruction set architecture (ISA). Processor cores with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

MCU 120 may coordinate functions that enable the processor device 100 to access and communicate with main memory (not shown) that includes a volatile memory and/or a non-volatile memory. In one implementation, the MCU 120 may include or may be coupled to a memory encryption engine (not shown). The encryption engine provides cryptographic mechanisms for encryption, integrity, and replay protection for secure pages in main memory. Secure pages in memory may refer to a page of memory, such as enclave page cache (EPC) memory 167, in which encryption, integrity, and replay protections are implemented to protect the pages from both hardware and software attacks.

The MCU 130 may include, among other things, a translation-lookaside buffer (TLB) 130 and a cache unit 140. The cache unit 140 may include, but is not limited to, level one cache (L1) 142, level two cache (L2) 144 and/or a last level cache (146), or any other configuration of cache memory within the processing device 120. In some implementations, L2 144 and other cache levels, such as last level cache 146, may be located off of the processing device 100. As shown, the cache unit 140 can be integrated into the processing device 100. Alternatively, a shared bus may be used to couple the cache unit 140 to the processing device 100. The cache unit 140 may store data (e.g., including instructions) that are utilized by one or more components of the processing device 100. For example, the cache unit 142 may locally cache data stored in the TLB 130 for faster access by the components of the processing device 100. Various components of the processor 100 may communicate with the cache unit 140 directly, through a bus and/or memory controller or a hub.

With reference to FIG. 1, the processor device 100 may execute instructions to identify and request access to memory pages from an EPC 167 page as guided by software implemented as instructions executing on the processing device 100, such as an operating system (OS) or a virtual machine monitor (VMM), as described herein. The processor device 100 may support virtual address spaces comprising memory locations of the requested memory pages. The memory space locations may be referenced by instructions, including load and store instructions, using virtual addresses. The virtual addresses, in turn, are translated into physical addresses in the main memory. In one implementation, the MCU 120 may generate and retrieve data and other information to satisfy these memory requests of the processor device 100 by translating the virtual address of the memory request to a physical address. For example, the TLB 130 maintains a mapping of address translation between virtual addresses and corresponding physical addresses. When a memory access request is received, such as for the EPC 167 page, the request may be intercepted by the MCU 120, which performs a lookup on the TLB 130. The look up may determine whether the TLB 130 contains the physical address corresponding to the virtual address of the EPC 167 page.

In one implementation, the processing device 100 may include a VMM 150. VMM 150 may also be referred to as a hypervisor. The VMM 150 may abstract a physical layer of a hardware platform of a host computer system, that may include processing device 100, and present this abstraction to a VM (may also be referred to as a "guest VM") 160 hosted by the host computer system. The VMM 150 provides a virtual operating platform for the VM 160, and manages the execution of the VM 150. Although only one VM 160 is shown in FIG. 1, the VMM 150 may also manage a plurality of other VMs. VM 160 may be a software implementation of a machine that executes programs as though it was an actual physical machine. The programs may include a guest operating system (OS), such as guest OS 165, and other types of software and/or applications.

In one implementation, VM 160 includes EPC memory 167. The EPC memory 167 provides a secure place for an application of the VM 160 to execute code and store data inside the context of an OS process. In one implementation, the EPC memory 167 includes enclave memory pages, such as a parent page 162 and a plurality of child pages 164a-164n associated with the parent page 162. The parent page 162 includes metadata about the EPC memory 167. Such metadata includes size of the EPC memory 167, base address of the EPC memory 167, total number of child pages 164a-n, and so on. Each of the plurality of child pages 164a-164n includes an address, which points to an address of the parent page 162. In one implementation, the parent page 162 and/or the child pages 164a-164n may be loaded from a memory (not shown) via a bus (not shown) into the EPC memory 167 of the VM 160.

In some implementations, some pages of the EPC 167 may store a secure enclave control structure (SECS), such as SECS 169. For example, SECS 169 may be created by the execution of an ECREATE instruction by a VM, such as VM 160, in order to generate a data structure to be used by and accessed by hardware (i.e., not readable, writable, or otherwise accessible by software, whether running inside or outside the enclave), to define, maintain, and protect the enclave. The SECS 169 may include one or more fields of any size (e.g., 256 or 512 bits) that store instructions and/or data associated with an enclave memory and/or an application or applications loaded into the enclave memory. When an application seeks to load an enclave, the application executes a command associated with the VM 160. The VM 160 may then add the SECS 169 to the enclave using the ECREATE command. After the SECS 169 is created, the VM 160 may add and evict pages to and from the enclave as requested by the application associated with VM 160.

In some implementations, the VMM 150 supports oversubscription, such as the sharing of one or more child pages of the EPC memory 167 (e.g., child pages 164a-n) amongst a plurality of VMs, such as VM 160. To support oversubscription, the VMM 150 includes an enclave information (info) module 170 to determine context information regarding an EPC page, and an enclave set context module 180 to apply the determined context information regarding the EPC page inside of an enclave. This context information may include information to maintain the relationship of child to parent pages in the EPC memory 167. For example, the modules 170, 180 may allow the VMM 150 to store parent page related information in a field of the SECS 169 loaded into the EPC memory 167 associated with the page. Modules 170 and 180 may be implemented in a fewer or greater number of modules than what is shown, with such modules residing at one or more processing devices. The modules 170 and 180 may operate in conjunction with the VMM 150 to receive and determine relevant information of the EPC memory 167 for oversubscribing the EPC pages associated with guest OS 165, as discussed in more detail below.

Figure 2:
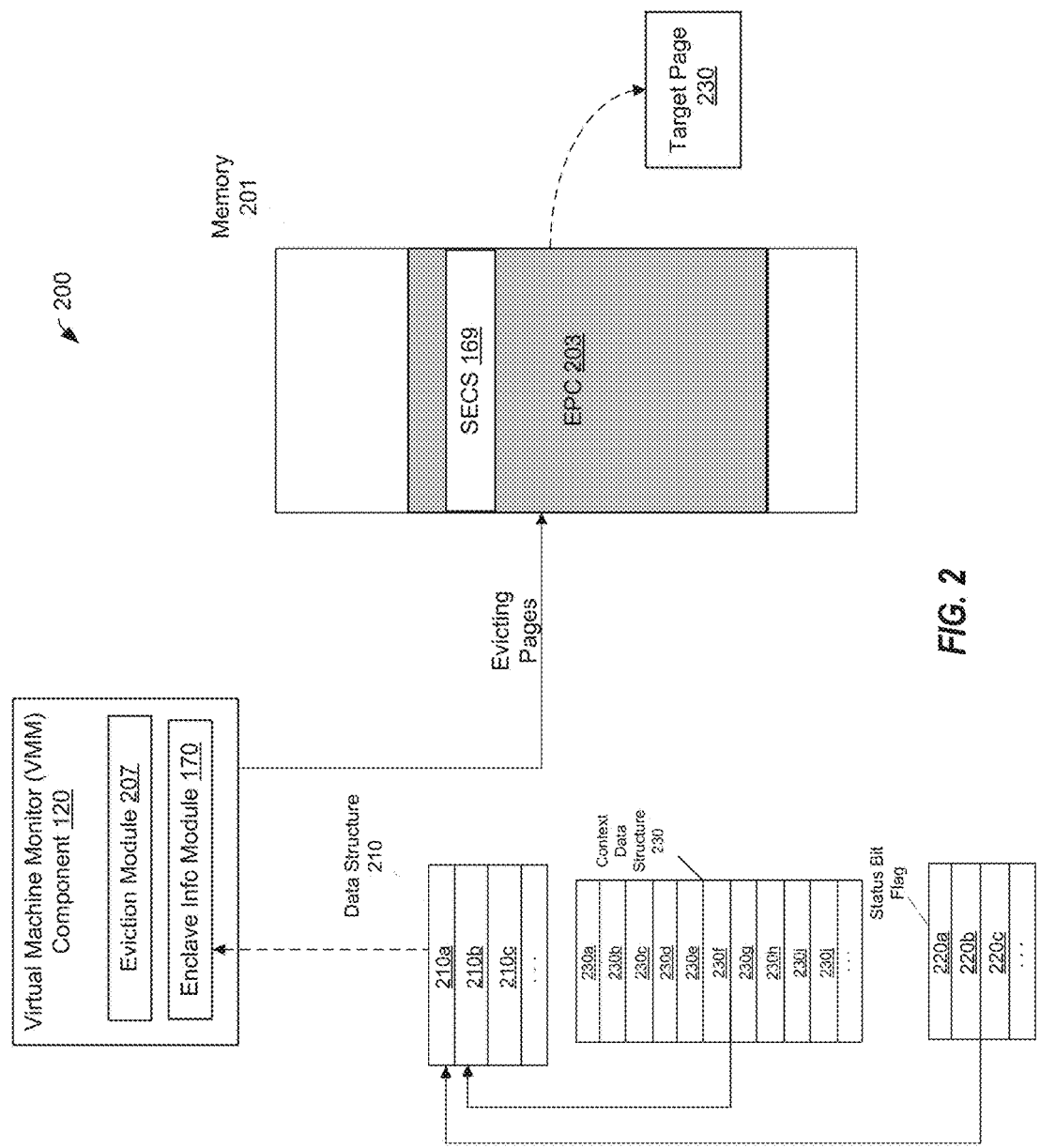
FIG. 2 illustrates a system comprising a data structure to support evicting enclave memory pages according to an implementation of the disclosure.

FIG. 2 illustrates a system 200 comprising a data structure 210 to support evicting enclave memory pages, for example, which may be used for oversubscription. In this example, the system 200 includes memory 201, which may include a volatile or non-volatile memory associated with processing device 100 of FIG. 1. The memory 201 may include a range of secure memory pages that make up EPC 203. Memory pages of the EPC 203 residing in main memory 201 are protected using encryption, integrity, and replay protections using processing device 100 described with respect to FIG. 1. VMM 120 may assign the EPC 203 to a guest (e.g., guest VM 160) which is free to manage the memory pages of the EPC 203 independently of the VMM 120. In accordance with some implementations, the VMM 120 may include components to execute certain instructions or operations that allow the VMM 120 to oversubscribe memory pages of the EPC 203 already assigned to a guest VM.

In one implementation, the VMM includes eviction module 207 and enclave info module 170. The eviction module 208 may evict memory pages from memory 201. The enclave info module 170 may execute a processor instruction (also referred to as "ERDINFO") that allows the VMM 120 to obtain relevant EPC usage information at any time to support paging of guest enclave pages. For example, the enclave info module 170 provides the VMM 120 with information about a given EPC page, such as a page type, attributes, SECS context, etc.

To provide information about a given EPC page, the enclave info module 170, when executed by the VMM 120, identifies a data structure, such as data structure 210. In some implementations, data structure 210 is also referred to as an ERDINFO structure. The data structure 210 may be stored in a field of the SECS 169 associated with the given EPC page. In one implementation, a memory address pointer to the data structure may be stored in the field of the SECS 169. The data structure 210 may include a number of fields (e.g., fields 210a-c), which may include relevant information regarding a given EPC page in the EPC 203. Each field may be of a determined size (e.g., 64-bits). In some implementations, the fields may include, for example, a STATUS field 210a, a FLAG field 210b, and an ENCLAVECONEXT field 210c.

In some implementations, the STATUS field 210a may include one or more bits, such as status bit flags 220a-220c. For example, each of status bit flags may include a bit that is set to indicate whether the EPC page is associated with any child pages. For example, if status bit flag 220a is set (e.g., to a value of 1), this indicates that the EPC page has one or more child pages present in the EPC. In this regard, for a non-EPC page this value is always set to a value of 0. If status bit flag 220b is set (e.g., to a count of the child pages), this indicates that the EPC page has one or more virtual child pages present in the EPC. In this regard, for a non-EPC page this value is always set to a value of 0. A virtual child page may refer to an EPC page that belongs to a VM but is managed by the VMM. In some implementations, the STATUS field 210a may include reserved bits, such as bit 220c, to provide further information regarding the parent-child relationship of the EPC 203 memory pages.

The data structure 210 may include various other fields regarding the EPC page. For example, the FLAG field 210b may include a 64-bit field that indicates a state of the EPC page. For example, the FLAG field 210b may include information reflecting an Enclave Page Cache Map (EPCM) stored inside of the EPC 203. The EPCM is used by an enclave memory to track security attributes of EPC pages. The EPCM information may be stored in a context data structure 230 associated with the FLAG field 210b. The context data structure 230 may include a plurality of bit flags (e.g., bit flags 230a-j) that may include information regarding the state of the EPC page. For example, the bit flags 230a-j may include, but not limited to, bit flag 230a which indicates the read permission for the page, bit flag 230b which indicates the write permission for the page, bit flag 230c which indicates the execute permission for the page, bit flag 230d which indicates a pending status for the page, bit flag 230e which indicates a modified status for the page, bit flag 230f which indicates a privileged status for the page, bit flag 230h which indicates a page type that may have security information (SECINFO) associated with the page, bit flag 230j which indicates a blocked status of the page, as well as other bit flags (e.g., bit flag 230g and 203i) that may be reserved for further EPCM information regarding the EPC page 230.

In some implementation, the ENCLAVECONEXT field 210c of the data structure 210 may include information regarding a parent page of the EPC page. For example, the ENCLAVECONEXT field 210c may include a pointer to a memory address of a parent page to the EPC page. In some implementations, when VM 160 successfully executes the ECREATE instruction to create new SECS or load the SECS into the EPC 203 from main memory, the processing device 100 stores an address the SECS in the ENCLAVECONEXT field 210c. In one implementation, the address of SECS 169 may be a guest physical address (GPA) of the SECS page determined as a result of paging memory for the VM associated with EPC 203. For example, when VM 160 executes an instruction for loading SECS 169, ENCLAVECONTEXT field 210c may contain GPA. In some implementations, the VMM 120 may execute an instruction to overwrite the address of the SECS stored in the ENCLAVECONEXT field 210c. For example, when VMM 120 executes for an instruction for loading SECS, the ENCLAVECONTEXT field may contain the host physical address (HPA). In this regard, VMM 120 may change the HPA to GPA to avoid confusing the guest VM.

In some implementations, the VMM 120 may identify a target page 230 that is to be physically evicted from the EPC 203. For example, target page 230 may be an EPC page of a VM that the VMM is using to provide oversubscription of memory to another VM. The VMM 120 may identify which target page 230 to be physically evicted when the contents of that target page 230 have been removed, and thus that target page 230 is empty and available. In this regard, the VMM may execute the eviction module 207 to physically remove the target page (whose content has been removed and thus is empty and available).

To determine whether the target page 230 can be evicted, the VMM 120 may execute enclave info module 170 with respect to the target page 230. In response, the VMM 120 may receive data structure 210 that includes context information related to the target memory page. The VMM 120 may then examine fields (e.g., 210a-c) of the data structure 210 to determine a state of the target page 230 (such as the EPCM state from inside the EPC 203) and whether the target memory page is associated with the parent page. For example, the data structure 210 may indicate an address pointer to the parent page as indicated by the FLAG field 210b of the data structure 210.

Based on the data structure 210, the VMM 120 may also determine whether the target page 230 has one or more child pages or virtual child pages present in an enclave. For example, the status bit flag 220a or status bit flag 220b of the data structure may be set to a count of any child or virtual child pages, respectively, associated with the target page 230. If the count of either the child pages or virtual child pages is not set to 0, the VMM is not allowed to evict the target page 230. In such cases, the VMM 220 may generate an error code, for example, to provide to a VM, or select another target page 230 to use for oversubscription. If the count of both of the child pages and virtual child pages is set to 0, then target page 230 can be evicted. In this case, the VMM is ready to produce an instruction to physically evict the target memory page from the EPC 203 in order for that page to be used by another VM.

Figure 3:
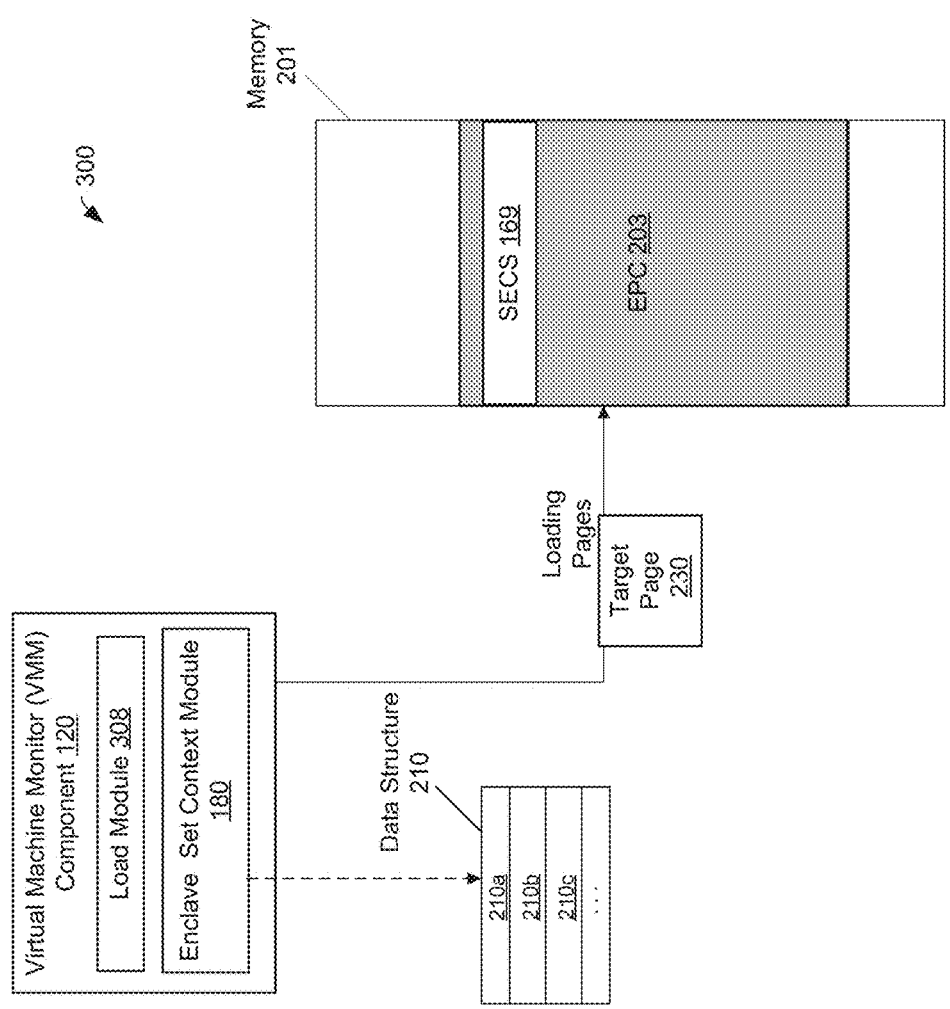
FIG. 3 illustrates a system comprising another data structure to support loading enclave memory pages according to an implementation of the disclosure.

FIG. 3 illustrates a system comprising a data structure to support loading enclave memory pages according to an implementation of the disclosure. After a target page 230 is evicted from an EPC, such as EPC 203 in memory 201, the target page 230 may be subsequently loaded back into the EPC 203 by the VMM 120. In this regard, the VMM includes enclave set context module 180, and load module 308 to load memory pages into memory 201.

In some implementations, the VMM 120 may load memory pages into memory 201 to identify the target page 230 to load into the EPC 203. For example, target page 230 may be an EPC page of a VM that the VMM was using to provide an oversubscription of memory to another VM. To load the target page 230 back into the EPC 203, it is necessary for the VMM to be able to locate the SECS pages associated with the target page. This may be necessary because the instruction for loading SECS needs the address of the SECS. In this regard, the VMM 120 may execute the processor instruction ERDINFO to identify the address of the SECS for the target page that is stored in the ENCLAVE-CONEXT field 210c of data structure 210. Once the SECS parent for the target page is identified, the load module 108 may map the target page to the SECS. For example, the VMM 120 may create a mapping to map the target page to the VM associated with the SECS.

In some implementations, if the target page is restored to the EPC 203, the VMM may execute the enclave context module 180 to restore a context of the page. For example, the enclave context module 180 that may execute a processor instruction, also referred to as "ESETCONTEXT", to load context information for the target page 230 restored by the VMM 120 back into EPC 203. In one implementation, this context information may include be the EPCM state information stored in data structure 210 so that the target page 203 may be restored to its previous state before it was evicted from the EPC 203.

Figure 4:
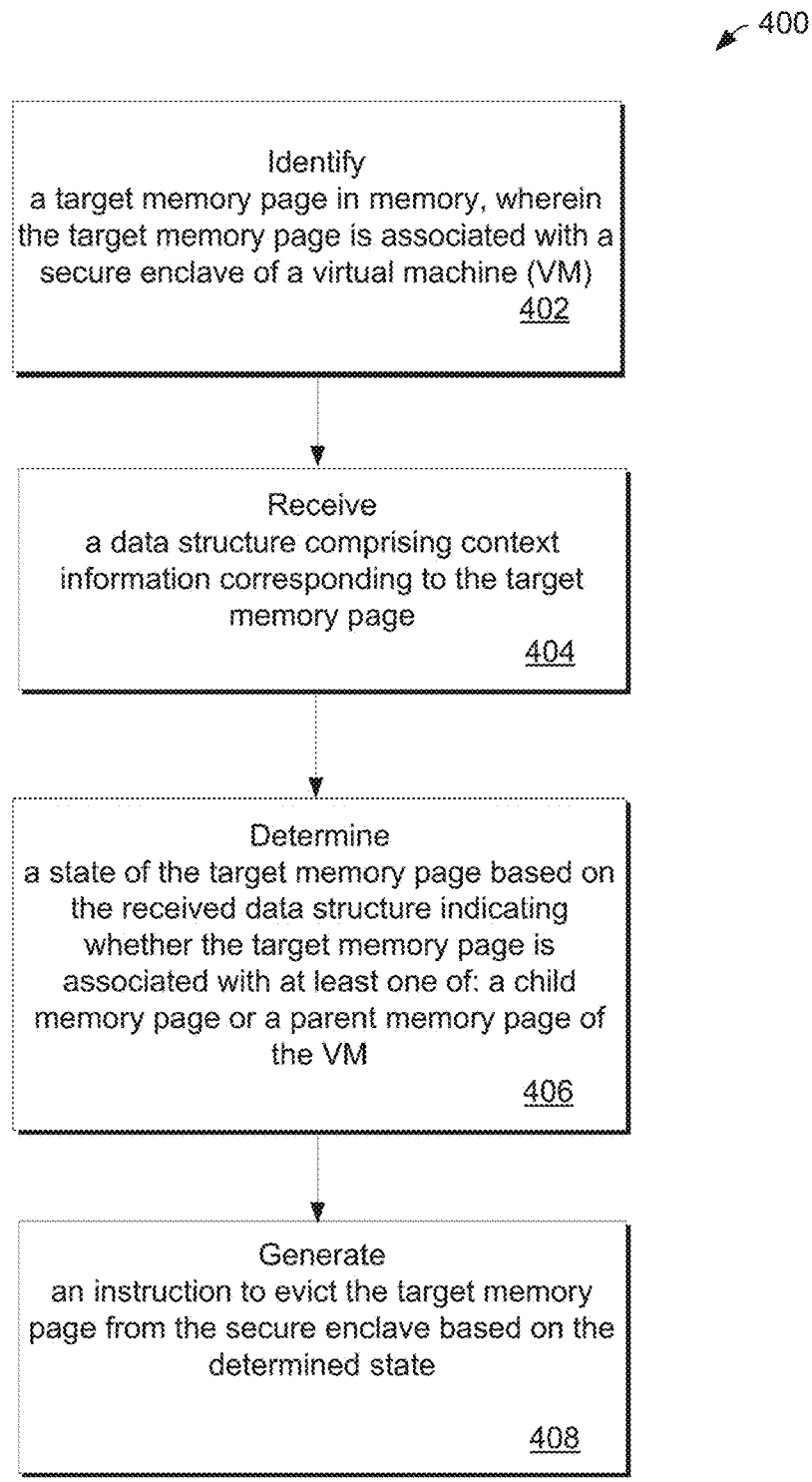
FIG. 4 a flow diagram of a method for evicting enclave memory pages according to an implementation of the disclosure.

FIG. 4 is a flow diagram of a method 400 for implementing control instructions of a processing device to support evicting enclave memory pages according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, the cores 110 of processing device 100 of FIG. 1 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various implementations. Thus, not all processes are required in every implementation. Other process flows are possible.

Method 400 begins at block 402 where a target memory page is identified in memory. The target memory page is associated with a secure enclave of a virtual machine (VM). In block 404, a data structure comprising context information corresponding to the target memory page is received. A state of the target memory page is determined in block 406 based on the data structure. The state indicates whether the target memory page is associated with at least one of: a child memory page or a parent memory page of the VM. In block 408, an instruction to evict the target memory page from the secure enclave is produced based on the determined state.

Figure 5:
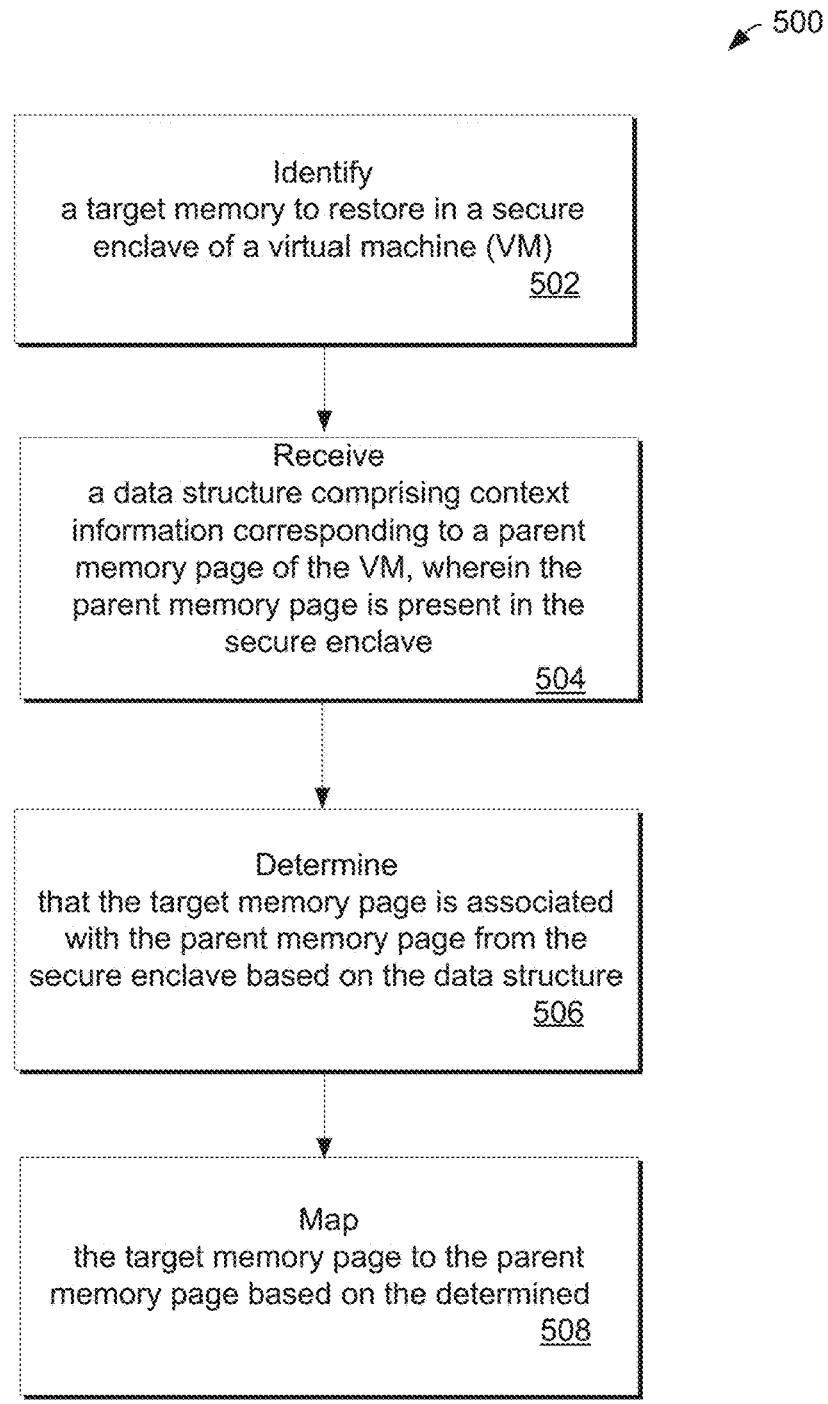
FIG. 5 a flow diagram of a method for loading enclave memory pages according to an implementation of the disclosure.

FIG. 5 is a flow diagram of a method 500 for implementing control instructions of a processing device to support loading enclave memory pages according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, the cores 110 of processing device 100 of FIG. 1 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various implementations. Thus, not all processes are required in every implementation. Other process flows are possible.

Method 500 begins at block 502 where a target memory to restore in a secure enclave of a virtual machine (VM) is identified. In block 504, a data structure comprising context information corresponding to a parent memory page of the VM is received. The parent memory page is present in the secure enclave. It is determined in block 506 that the target memory page is associated with the parent memory page from the secure enclave based on the data structure. In block 508, the target memory page is mapped to the parent memory page based on the determined.

FIG. 6A is a block diagram illustrating a micro-architecture for a processor 600 that implements techniques to support oversubscription of guest enclave memory pages in accordance with one implementation of the disclosure. Specifically, processor 600 depicts an in-order architecture core and a register renaming logic, out-of-order issue/execution logic to be included in a processor according to at least one implementation of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one implementation, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 656, physical register file(s) unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some implementations DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary implementation, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one implementation, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 600 may be the same as processing device 100 described with respect to FIG. 1 to support oversubscription of guest enclave memory pages in a processing device described with respect to implementations of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some implementations of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some implementations, the ordering of stages 602-624 may be different than illustrated and are not limited to the specific ordering shown in FIG. 6B.

Figure 7:
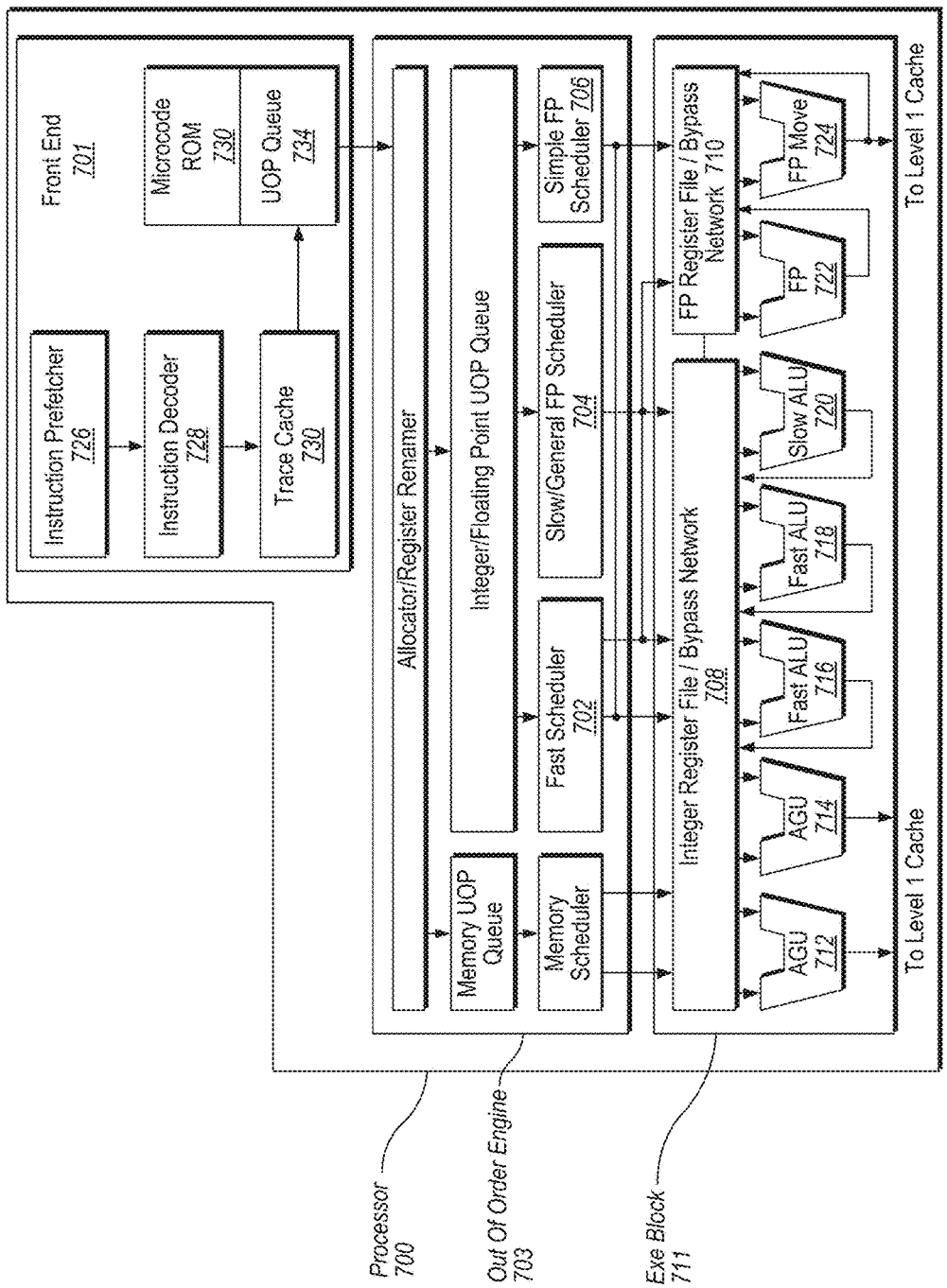
FIG. 7 is a block diagram illustrating a micro-architecture for a processor in accordance with one implementation of the disclosure.

FIG. 7 illustrates a block diagram of the micro-architecture for a processor 700 that includes logic circuits to support oversubscription of guest enclave memory pages in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline.

The front end 701 may include several units. In one implementation, the instruction prefetcher 726 fetches instructions from memory and feeds them to an instruction decoder 728 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one implementation, if more than four micro-ops are needed to complete an instruction, the decoder 728 accesses the microcode ROM 732 to do the instruction. For one implementation, an instruction can be decoded into a small number of micro ops for processing at the instruction decoder 728. In another implementation, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one implementation can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one implementation also includes a bypass network that can bypass or forward just completed results that have not yet been written into the register file to new dependent uops. The integer register file 708 and the floating point register file 710 are also capable of communicating data with the other. For one implementation, the integer register file 708 is split into two separate register files, one register file for the low order 32 bits of data and a second register file for the high order 32 bits of data. The floating point register file 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 722, floating point move unit 724. For one implementation, the floating point execution blocks 722, 724, execute floating point, MMX, SIMD, and SSE, or other operations. The floating point ALU 722 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 716, 718. The fast ALUs 716, 718, of one implementation can execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one implementation, the integer ALUs 716, 718, 720, are described in the context of performing integer operations on 64 bit data operands. In alternative implementations, the ALUs 716, 718, 720, can be implemented to support a variety of data bits including 16, 32, 128, 256, etc. Similarly, the floating point units 722, 724, can be implemented to support a range of operands having bits of various widths. For one implementation, the floating point units 722, 724, can operate on 128 bits wide packed data operands in conjunction with SIMD and multimedia instructions.

In one implementation, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The processor 700 also includes logic to implement store address prediction for memory disambiguation according to implementations of the disclosure. In one implementation, the execution block 711 of processor 700 may include a store address predictor (not shown) for supporting oversubscription of guest enclave memory pages.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 8:
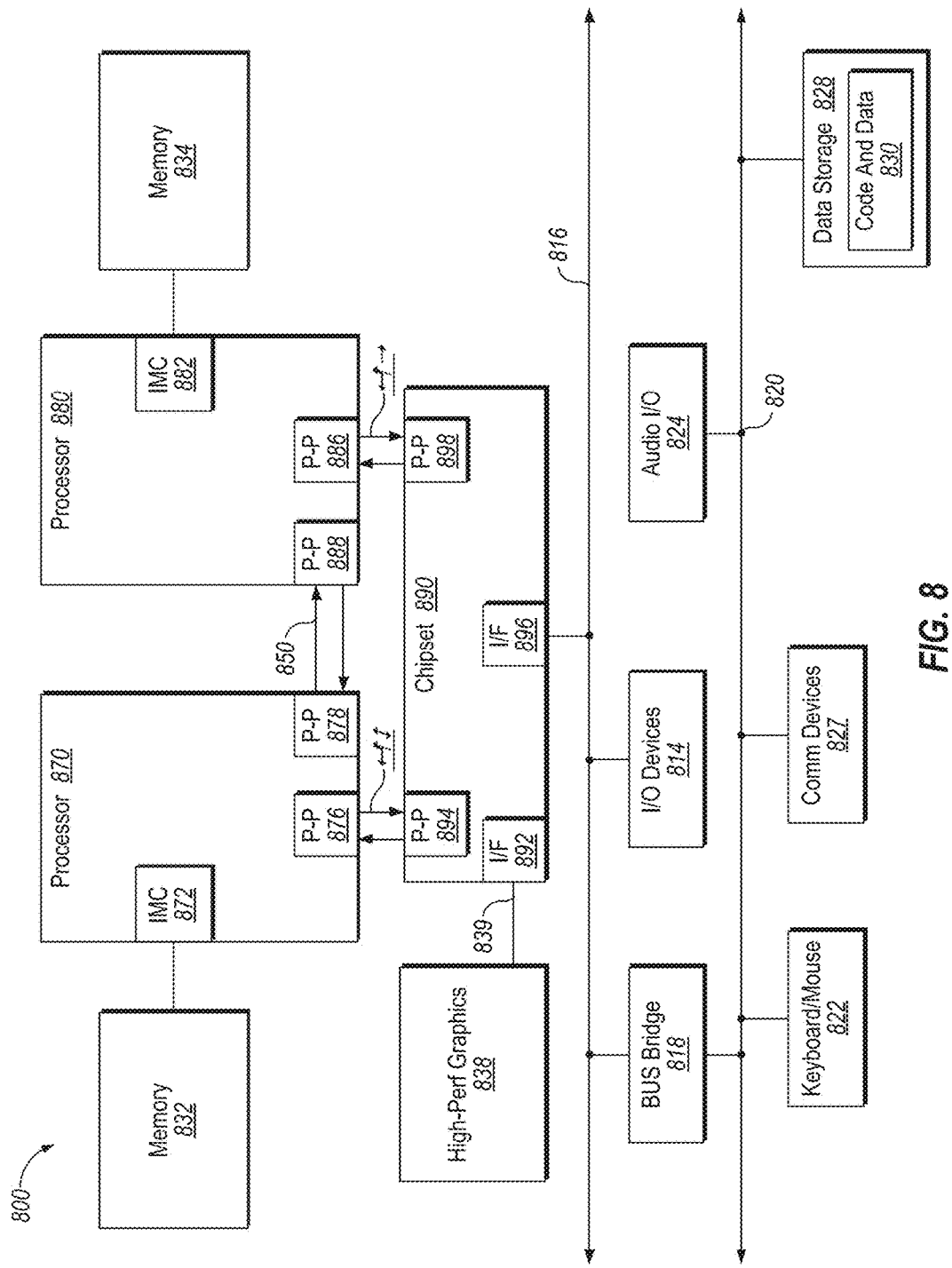
FIG. 8 is a block diagram illustrating a system in which an implementation of the disclosure may be used.

Implementations may be implemented in many different system types. Referring now to FIG. 8, shown is a block diagram illustrating a system 800 in which an implementation of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of implementations of the disclosure is not so limited. In other implementations, one or more additional processors may be present in a given processor. In one implementation, the multiprocessor system 800 may support oversubscription of guest enclave memory pages as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one implementation, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one implementation, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one implementation. Further, an audio I/O 824 may be coupled to second bus 820. Note that other architectures are possible. For example, instead of the point-to-point architecture of FIG. 8, a system may implement a multi-drop bus or other such architecture.

Figure 9:
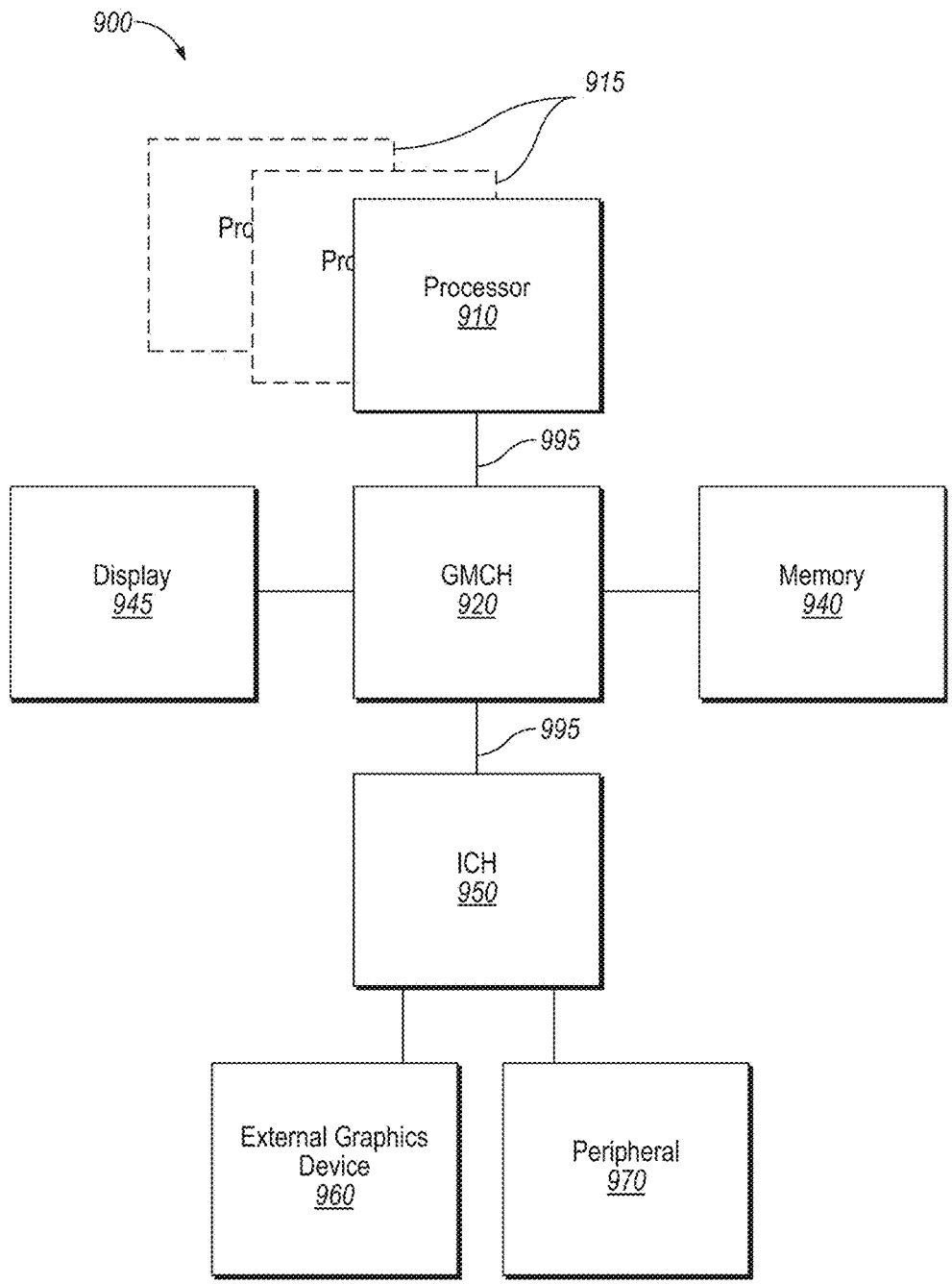
FIG. 9 is a block diagram illustrating a system in which an implementation of the disclosure may operate.

Referring now to FIG. 9, shown is a block diagram of a system 900 in which one implementation of the disclosure may operate. The system 900 may include one or more processors 910, 915, which are coupled to graphics memory controller hub (GMCH) 920. The optional nature of additional processors 915 is denoted in FIG. 9 with broken lines. In one implementation, processors 910, 915 support oversubscription of guest enclave memory pages according to implementations of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one implementation, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one implementation, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the implementation of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one implementation, the various processors 910, 915 may reside in the same die package.

Figure 10:
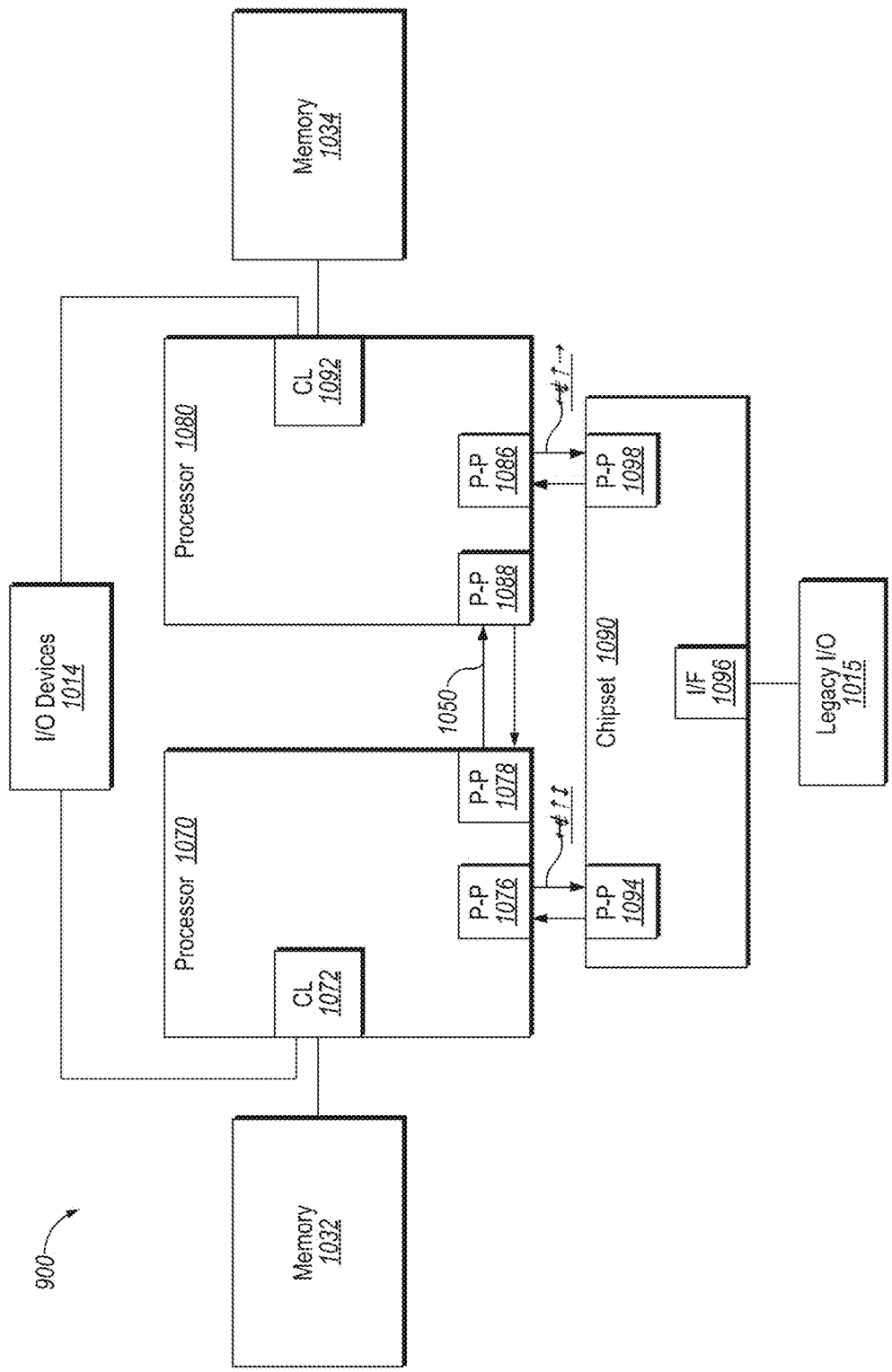
FIG. 10 is a block diagram illustrating a system in which an implementation of the disclosure may operate.

Referring now to FIG. 10, shown is a block diagram of a system 1000 in which an implementation of the disclosure may operate. FIG. 10 illustrates processors 1070, 1080. In one implementation, processors 1070, 1080 may support oversubscription of guest enclave memory pages as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one implementation, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
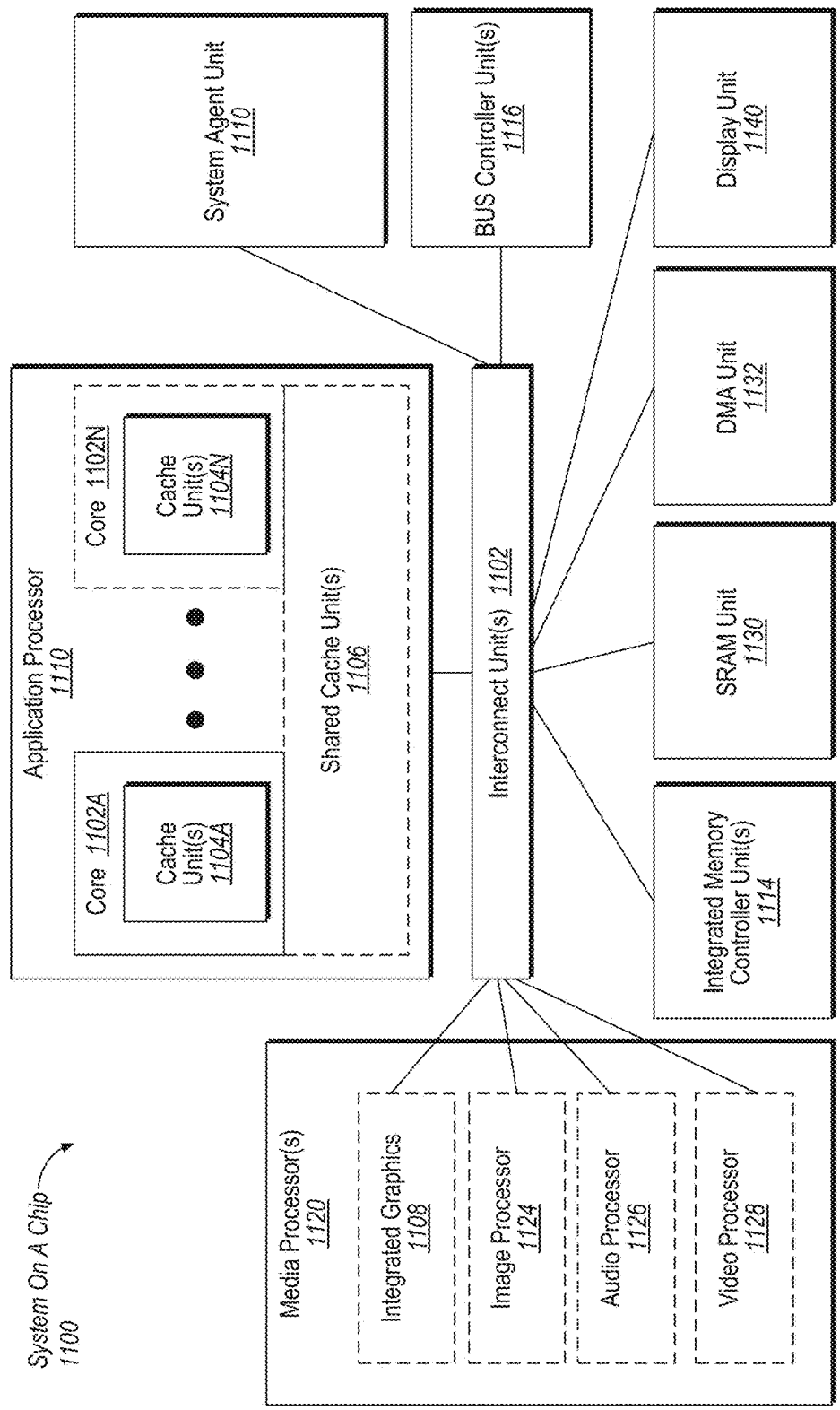
FIG. 11 is a block diagram illustrating a System-on-a-Chip (SoC) according to an implementation of the disclosure.

Implementations may be implemented in many different system types. FIG. 11 is a block diagram of a SoC 1100 in accordance with an implementation of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one implementation, a memory module may be included in the integrated memory controller unit(s) 1114. In another implementation, the memory module may be included in one or more other components of the SoC 1100 that may be used to access and/or control a memory. The application processor 1120 may include a PMU for implementing silent memory instructions and miss-rate tracking to optimize switching policy on threads as described in implementations herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some implementations, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
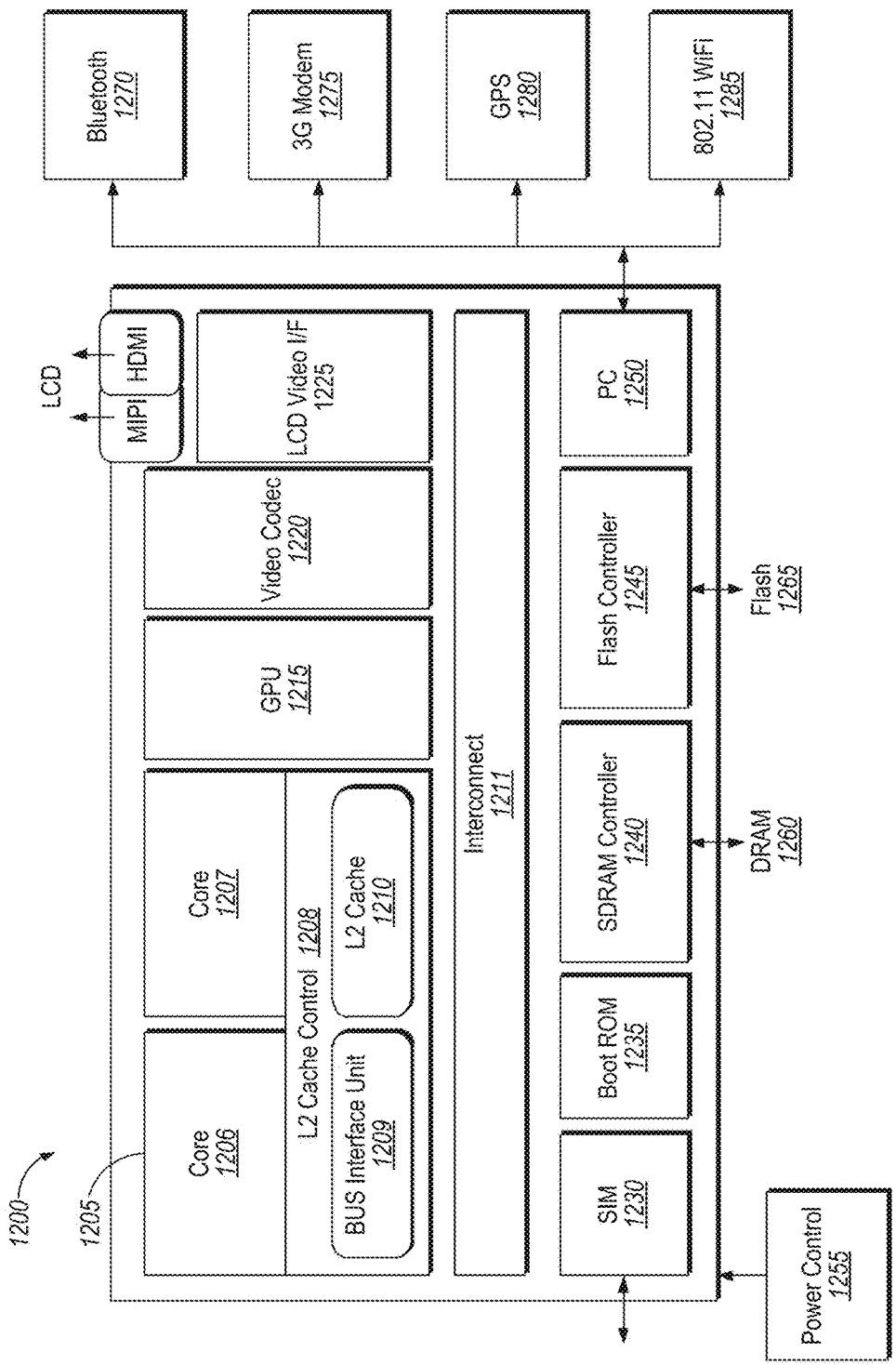
FIG. 12 is a block diagram illustrating a SoC design according to an implementation of the disclosure.

FIG. 12 is a block diagram of an implementation of a system on-chip (SoC) design in accordance with the disclosure. As a specific illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one implementation, cores 1206, 1207 may support oversubscription of guest enclave memory pages described in implementations herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
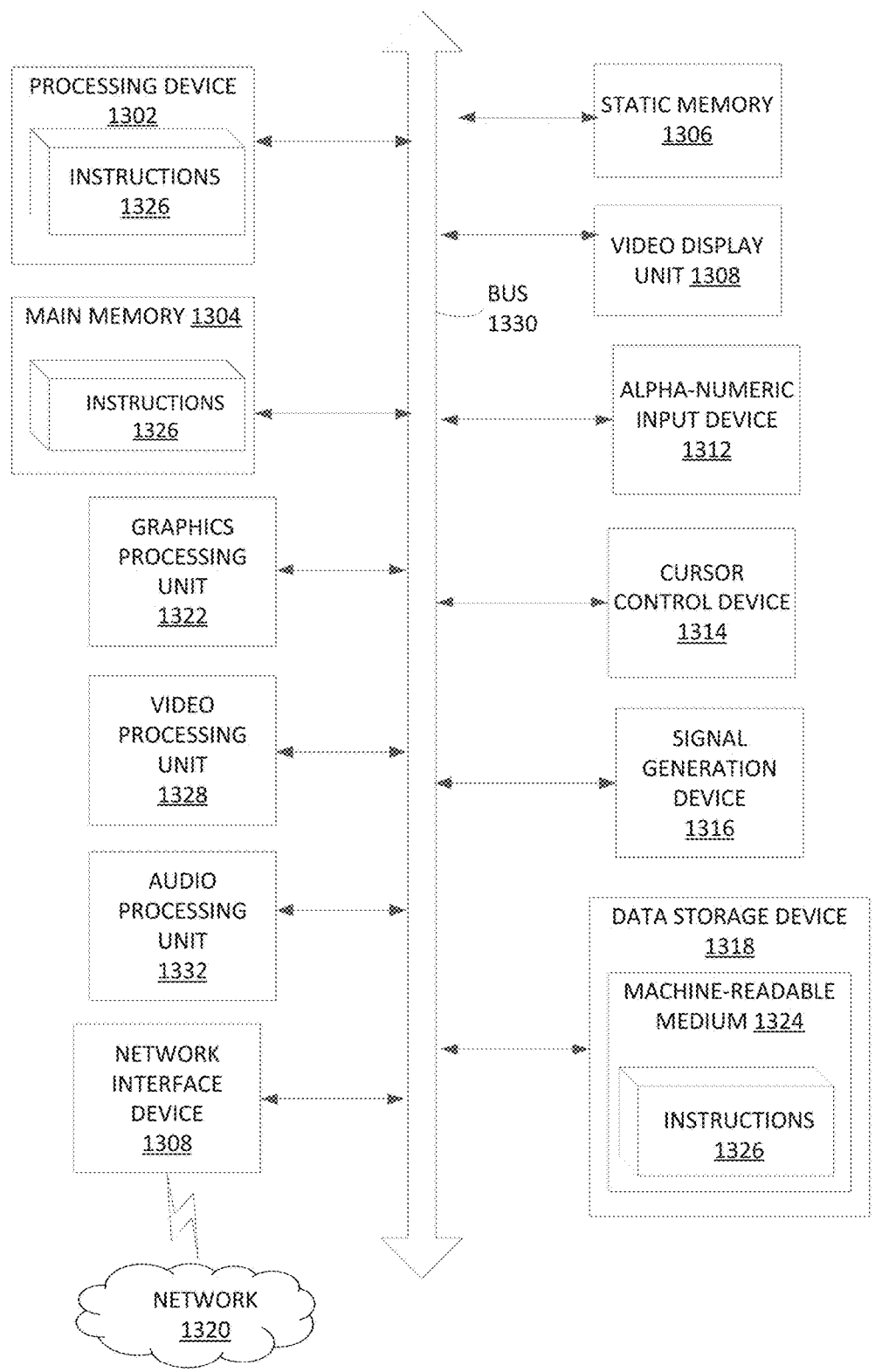
FIG. 13 illustrates a block diagram illustrating a computer system according to an implementation of the disclosure.

FIG. 13 illustrates a diagrammatic representation of a machine in the example form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet.

The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one implementation, processing device 1302 may include one or processing cores. The processing device 1302 is configured to execute the processing logic 1326 for performing the operations and steps discussed herein. In one implementation, processing device 1302 is the same as processor architecture 100 described with respect to FIG. 1 that implements oversubscription of guest enclave memory pages as described herein with implementations of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a non-transitory machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The non-transitory machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the non-transitory machine-accessible storage medium 1324 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further implementations.

Example 1 includes a processing device comprising: 1) a memory controller unit to access a secure enclave; and 2) a processor core, operatively coupled to the memory controller unit, to: a) identify a target memory page in memory, wherein the target memory page is associated with a secure enclave of a virtual machine (VM); b) receive a data structure comprising context information corresponding to the target memory page; c) determine a state of the target memory page based on the received data structure, the state indicating whether the target memory page is associated with at least one of: a child memory page or a parent memory page of the VM; and d) generate an instruction to evict the target memory page from the secure enclave based on the determined state.

Example 2 includes the processing device of Example 1, wherein the processor core is further to: 1) determine that the target memory page is associated with the parent memory page; and 2) identify address pointer to the parent memory page within the secure enclave.

Example 3 includes the processing device of Example 2, wherein the processor core is further to update the data structure associate the target memory page with the address pointer to the memory parent page.

Example 4 includes the processing device of Example 1, wherein the processor core is further to: 1) determine that the target memory page is associated with one or more child memory pages; and 2) identify a count of the one or more child memory pages based on the received data structure.

Example 5 includes the processing device of Example 4, wherein the processor core is further to identify that the one or more child memory pages comprises a virtual child memory page based on the received data structure.

Example 6 includes the processing device of Example 4, wherein the processor core is further to responsive to detecting that the count of the one or more child memory pages is zero, execute the instruction to evict the target memory page from memory.

Example 7 includes the processing device of Example 4, wherein the processor core is further to, responsive to detecting that the count of the one or more child memory pages is not zero, determine whether the one or more child memory pages are present in the secure enclave based on the received data structure.

Example 8 includes a method comprising: 1) identifying a target memory page in memory, wherein the target memory page is associated with a secure enclave of a virtual machine (VM); 2) receiving, by a processing device, a data structure comprising context information corresponding to the target memory page; 3) determining, by the processing device, a state of the target memory page based on the received data structure, the state indicating whether the target memory page is associated with at least one of: a child memory page or a parent memory page of the VM; and 4) generating an instruction to evict the target memory page from the secure enclave based on the determined state.

Example 9 includes the method of Example 8, further comprising: 1) determining that the target memory page is associated with the parent memory page; and 2) identifying address pointer to the parent memory page within the secure enclave.

Example 10 includes the method of Example 9, further comprising updating the data structure associate the target memory page with the address pointer to the memory parent page.

Example 11 includes the method of Example 8, further comprising: 1) determining that the target memory page is associated with one or more child memory pages; and 2) identifying a count of the one or more child memory pages based on the received data structure.

Example 12 includes the method of Example 11, further comprising identifying that the one or more child memory pages comprises a virtual child memory page based on the received data structure.

Example 13 includes the method of Example 11, further comprising responsive to detecting that the count of the one or more child memory pages is zero, executing the instruction to evict the target memory page from memory.

Example 14 includes the method of Example 11, further comprising responsive to detecting that the count of the one or more child memory pages is not zero, determining whether the one or more child memory pages are present in the secure enclave based on the received data structure.

Example 15 includes a system on chip (SoC) comprising: 1) a memory controller unit (MCU); and 2) a processor, operatively coupled to the MCU, to: a) identify a target memory page in memory, wherein the target memory page is associated with a secure enclave of a virtual machine (VM); b) receive a data structure comprising context information corresponding to the target memory page; c) determine a state of the target memory page based on the received data structure, the state indicating whether the target memory page is associated with at least one of: a child memory page or a parent memory page of the VM; and d) generate an instruction to evict the target memory page from the secure enclave based on the determined state.

Example 16 includes the SoC of Example 15, wherein the processor is further to: 1) determine that the target memory page is associated with the parent memory page; and 2) identify address pointer to the parent memory page within the secure enclave.

Example 17 includes the SoC of Example 16, wherein the processor is further to update the data structure associate the target memory page with the address pointer to the memory parent page.

Example 18 includes the SoC of Example 15, wherein the processor is further to: 1) determine that the target memory page is associated with one or more child memory pages; and 2) identify a count of the one or more child memory pages based on the received data structure.

Example 19 includes the SoC of Example 18, wherein the processor is further to identify that the one or more child memory pages comprises a virtual child memory page based on the received data structure.

Example 20 includes the SoC of Example 18, wherein the processor is further to responsive to detecting that the count of the one or more child memory pages is zero, execute the instruction to evict the target memory page from memory.

Example 21 includes the SoC of Example 18, wherein the processor is further to responsive to detecting that the count of the one or more child memory pages is not zero, determine whether the one or more child memory pages are present in the secure enclave based on the received data structure.

Example 22 includes a non-transitory machine-readable storage medium including instructions that, when executed by a processing device, cause the processing device to: 1) identify, by the processing device, a target memory page in memory, wherein the target memory page is associated with a secure enclave of a virtual machine (VM); 2) receive a data structure comprising context information corresponding to the target memory page; 3) determine a state of the target memory page based on the received data structure, the state indicating whether the target memory page is associated with at least one of: a child memory page or a parent memory page of the VM; and 4) generate an instruction to evict the target memory page from the secure enclave based on the determined state.

Example 23 includes the non-transitory machine-readable storage medium of Example 22, wherein the processing device is further to: 1) determine that the target memory page is associated with the parent memory page; and 2) identify address pointer to the parent memory page within the secure enclave.

Example 24 includes the non-transitory machine-readable storage medium of Example 23, wherein the processing device is further to update the data structure associate the target memory page with the address pointer to the memory parent page.

Example 25 includes the non-transitory machine-readable storage medium 23, wherein the processing device is further to: 1) determine that the target memory page is associated with one or more child memory pages; and 2) identify a count of the one or more child memory pages based on the received data structure.

Example 26 includes the non-transitory machine-readable storage medium of Example 23, wherein the processor is further to identify that the one or more child memory pages comprises a virtual child memory page based on the received data structure.

Example 27 includes the non-transitory machine-readable storage medium of Example 23, wherein the processor is further to responsive to detecting that the count of the one or more child memory pages is zero, execute the instruction to evict the target memory page from memory.

Example 28 includes the non-transitory machine-readable storage medium of Example 23, wherein the processor is further to responsive to detecting that the count of the one or more child memory pages is not zero, determine whether the one or more child memory pages are present in the secure enclave based on the received data structure.

Example 29 includes a non-transitory, computer-readable storage medium including instructions that, when executed by a processor, cause the processor to perform the method of Examples 8-14.

Example 30 includes an apparatus comprising: 1) a plurality of functional units of a processor; 2) means for identifying a target memory page in memory, wherein the target memory page is associated with a secure enclave of a virtual machine (VM); 3) means for receiving a data structure comprising context information corresponding to the target memory page; 4) means for determining a state of the target memory page based on the received data structure, the state indicating whether the target memory page is associated with at least one of: a child memory page or a parent memory page of the VM; and 5) means for generating an instruction to evict the target memory page from the secure enclave based on the determined state.

Example 31 includes the apparatus of Example 30, further comprising the subject matter of any of Examples 1-7 and 15-21.

Example 32 includes a system comprising: 1) a memory device and 2) a processor comprising a memory controller unit, wherein the processor is configured to perform the method of any of Examples 8-14.

Example 33 includes the system of Example 32, further comprising the subject matter of any of Examples 1-7 and 15-21.

Example 34 includes a processing device comprising: 1) a memory controller unit to access a secure enclave; and 2) a processor core, operatively coupled to the memory controller unit, to: a) identify a target memory to restore in a secure enclave of a virtual machine (VM); b) receive a data structure comprising context information related to a parent memory page of the VM, wherein the parent memory page is present in the secure enclave; c) determine that the target memory page is associated with the parent memory page from the secure enclave based on the data structure; and d) map the target memory page to the parent memory page based on the determined.

Example 35 includes the processing device of Example 34, wherein the processor core is further to restore information associated with the target memory with the context information from the data structure related to the parent memory page.

Example 36 includes a method comprising: 1) identifying, by a processing device, a target memory to restore in a secure enclave of a virtual machine (VM); 2) receiving, by the processing device, a data structure comprising context information related to a parent memory page of the VM, wherein the parent memory page is present in the secure enclave; 3) determining that the target memory page is associated with the parent memory page from the secure enclave based on the data structure; and 4) mapping, by the processing device, the target memory page to the parent memory page based on the determined.

Example 37 includes the processing device of Example 34, further comprising restoring information associated with the target memory with the context information from the data structure related to the parent memory page.

Example 38 includes a system on chip (SoC) comprising: 1) a memory controller unit (MCU); and 2) a processor, operatively coupled to the MCU, to: a) identify a target memory to restore in a secure enclave of a virtual machine (VM); b) receive a data structure comprising context information related to a parent memory page of the VM, wherein the parent memory page is present in the secure enclave; c) determine that the target memory page is associated with the parent memory page from the secure enclave based on the data structure; and d) map the target memory page to the parent memory page based on the determined.

Example 39 includes the SoC of Example 38, wherein the processor is further to restore information associated with the target memory with the context information from the data structure related to the parent memory page.

Example 40 includes a non-transitory machine-readable storage medium including instructions that, when executed by a processing device, cause the processing device to: 1) identify, by the processing device, a target memory to restore in a secure enclave of a virtual machine (VM); 2) receive a data structure comprising context information related to a parent memory page of the VM, wherein the parent memory page is present in the secure enclave; 3) determine that the target memory page is associated with the parent memory page from the secure enclave based on the data structure; and 4) map the target memory page to the parent memory page based on the determined.

Example 41 includes the non-transitory machine-readable storage medium of Example 40, wherein the processing device is further to restore information associated with the target memory with the context information from the data structure related to the parent memory page.

Example 42 includes a non-transitory, computer-readable storage medium including instructions that, when executed by a processor, cause the processor to perform the method of Examples 36-37.

Example 43 includes an apparatus comprising: 1) a plurality of functional units of a processor; 2) means for identifying a target memory to restore in a secure enclave of a virtual machine (VM); 3) means for receiving a data structure comprising context information related to a parent memory page of the VM, wherein the parent memory page is present in the secure enclave; 4) means for determining that the target memory page is associated with the parent memory page from the secure enclave based on the data structure; and 5) means for mapping the target memory page to the parent memory page based on the determined.

Example 44 includes the apparatus of Example 43, further comprising the subject matter of any of Examples 34-35 and 38-39.

Example 45 includes a system comprising: 1) a memory device and 2) a processor comprising a memory controller unit, wherein the processor is configured to perform the method of any of Examples 36-37.

Example 46 includes the system of Example 45, further comprising the subject matter of any of Examples 34-35 and 38-39.

While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A method comprising:
    identifying a target memory page in memory, wherein the target memory page is associated with a secure enclave of a virtual machine (VM);
    receiving, by a processing device, a data structure comprising context information corresponding to the target memory page;
    determining, by the processing device, that the target memory page is associated with one or more child memory pages;
    identifying, by the processing device, a count of the one or more child memory pages based on the data structure;
    determining, by the processing device, a state of the target memory page based on the data structure, the state indicating whether the target memory page comprises a parent memory page of the secure enclave of the VM that is linked to an active child memory page of the one or more child memory pages; and
    generating an instruction to evict the target memory page from the secure enclave based on the state.

2. The method of claim 1, further comprising:
    determining that the target memory page is associated with the parent memory page; and
    identifying an address pointer to the parent memory page within the secure enclave.

3. The method of claim 2, further comprising updating the data structure to associate the target memory page with the address pointer to the memory parent page.

4. The method of claim 1, wherein identifying the count of the one or more child memory pages further comprises reading a status bit flag, of the data structure, that is set to the count of the one or more child memory pages.

5. The method of claim 1, further comprising identifying that the one or more child memory pages comprises a virtual child memory page based on the data structure.

6. The method of claim 1, further comprising responsive to detecting that the count of the one or more child memory pages is zero, executing the instruction to evict the target memory page from memory.

7. The method of claim 1, further comprising responsive to detecting that the count of the one or more child memory pages is not zero, selecting a second target memory page for oversubscription of the secure enclave.

8. A processing device comprising:
    a memory controller unit to access a secure enclave; and
    a processor core, operatively coupled to the memory controller unit, to:
        identify a target memory page to restore in a secure enclave of a virtual machine (VM);
        determine that the target memory page is associated with one or more child memory pages;
        receive a data structure comprising context information related to a parent memory page of the VM, wherein the parent memory page is present in the secure enclave;
        identify a count of the one or more child memory pages based on the data structure;
        determine, based on the data structure, whether the parent memory page is linked to an active child memory page, of the one or more child memory pages, within the secure enclave; and
        map, responsive to a determination that the parent memory page is linked to the active child memory page, the target memory page to the parent memory page.

9. The processing device of claim 8, wherein the processor core is further to restore information associated with the target memory page with the context information from the data structure related to the parent memory page.

10. A processing device comprising:
    a memory controller unit; and
    a processor core, operatively coupled to the memory controller unit, to:
        identify a target memory page in memory, wherein the target memory page is associated with a secure enclave of a virtual machine (VM);
        receive a data structure comprising context information corresponding to the target memory page;
        determine that the target memory page is associated with one or more child memory pages;
        identify a count of the one or more child memory pages based on the data structure;
        determine a state of the target memory page based on the data structure, the state indicating whether the target memory page comprises a parent memory page of the secure enclave of the VM that is linked to an active child memory page of the one or more child memory pages; and
        generate an instruction to evict the target memory page from the secure enclave based on the state.

11. The processing device of claim 10, wherein the processor core is further to:
    determine that the target memory page is associated with the parent memory page; and
    identify an address pointer to the parent memory page within the secure enclave.

12. The processing device of claim 11, wherein the processor core is further to update the data structure to associate the target memory page with the address pointer to the memory parent page.

13. The processing device of claim 10, wherein to identify the count of the one or more child memory pages, the processor core is further to read a status bit flag, of the data structure, that is set to the count of the one or more child memory pages.

14. The processing device of claim 10, wherein the processor core is further to identify that the one or more child memory pages comprises a virtual child memory page based on the data structure.

15. The processing device of claim 10, wherein the processor core is further to responsive to detecting that the count of the one or more child memory pages is zero, execute the instruction to evict the target memory page from memory.

16. The processing device of claim 10, wherein the processor core is further to responsive to detecting that the count of the one or more child memory pages is not zero, select a second target memory page for oversubscription of the secure enclave.

17. A non-transitory machine-readable storage medium including instructions that, when executed by a processing device, cause the processing device to:
- identify, by the processing device, a target memory page in memory, wherein the target memory page is associated with a secure enclave of a virtual machine (VM);
- receive a data structure comprising context information corresponding to the target memory page;
- determine that the target memory page is associated with one or more child memory pages;
- identify a count of the one or more child memory pages based on the data structure;
- determine a state of the target memory page based on the data structure, the state indicating whether the target memory page comprises a parent memory page of the secure enclave of the VM that is linked to an active child memory page of the one or more child memory pages; and
- generate an instruction to evict the target memory page from the secure enclave based on the state.

18. The non-transitory machine-readable storage medium of claim 17, wherein the processing device is further to:
- determine that the target memory page is associated with the parent memory page; and
- identify an address pointer to the parent memory page within the secure enclave.

19. The non-transitory machine-readable storage medium of claim 18, wherein the processing device is further to update the data structure to associate the target memory page with the address pointer to the memory parent page.

20. The non-transitory machine-readable storage medium of claim 17, wherein to identify the count of the one or more child memory pages, the processing device is further to read a status bit flag, of the data structure, that is set to the count of the one or more child memory pages.

\* \* \* \* \*